Nov. 5, 1935.   N. M. THOMAS   2,019,877
APPARATUS FOR FORMING CONFECTIONS
Filed June 26, 1933   2 Sheets-Sheet 1
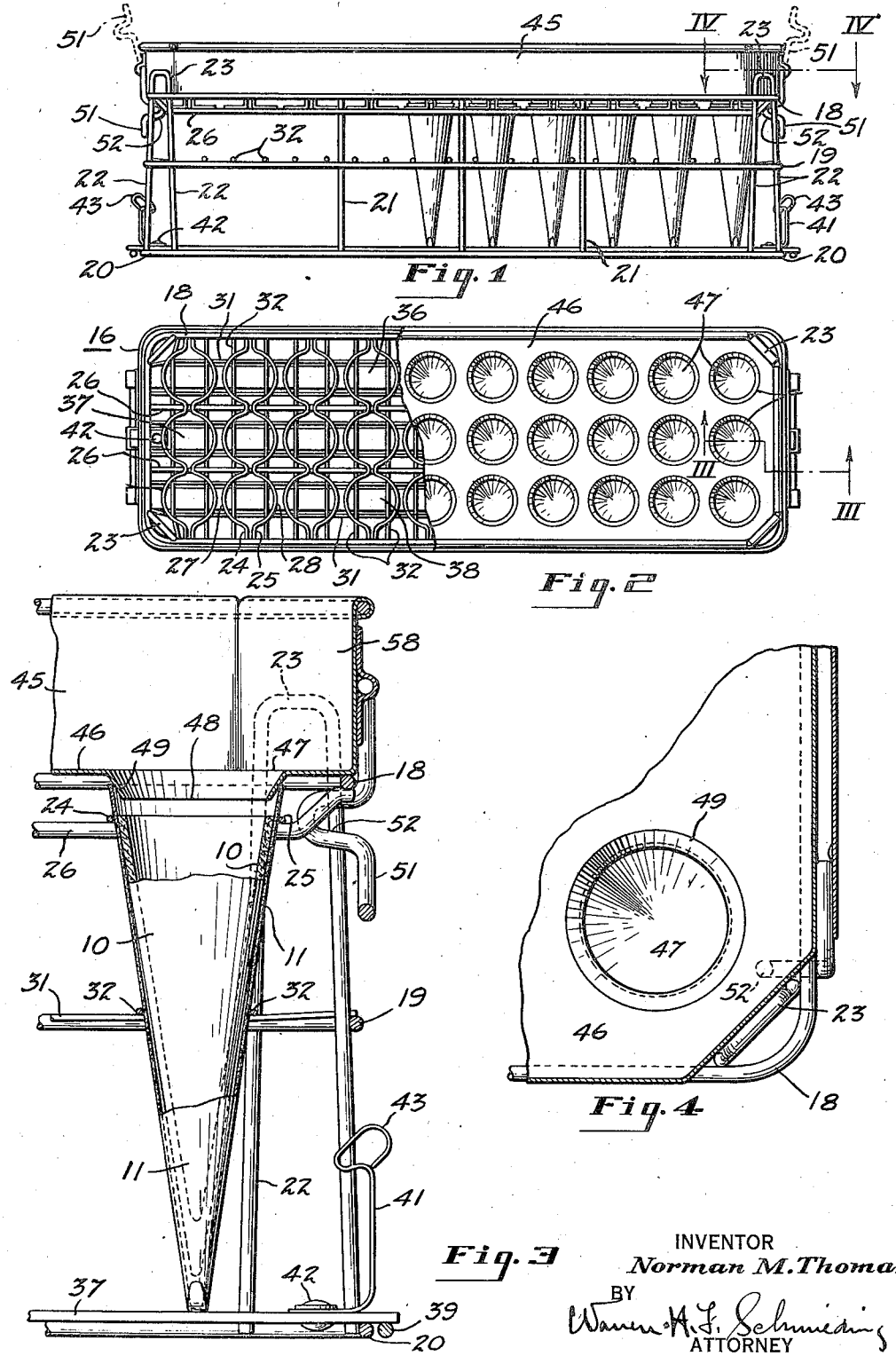
INVENTOR
*Norman M. Thomas*
BY
ATTORNEY

Patented Nov. 5, 1935

2,019,877

UNITED STATES PATENT OFFICE 2,019,877

APPARATUS FOR FORMING CONFECTIONS

Norman M. Thomas, Brooklyn, N. Y., assignor to Joe Lowe Corporation, Brooklyn, N. Y., a corporation of Delaware Application June 26, 1933, Serial No. 677,535

10 Claims. (Cl. 226—93)

The present invention relates to the art of making frozen novelties, and it has particular relation to improvements in apparatus for filling, refrigerating and harvesting open-top confections, such as ice cream cones and the like.

An object of the invention is to provide improved apparatus of a simple and inexpensive construction for simultaneously filling, refrigerating and harvesting a plurality of open-top containers in an efficient and sanitary manner.

Another object of the invention is the provision of improved apparatus including a net-like rack which will support a plurality of open-top containers, and a filling pan adapted to be positioned over the rack having a plurality of openings in the bottom thereof provided with outlet projections extending into each of the open-top containers in the rack for diverting a predetermined quantity of edible material from the pan into each container.

A further object of the invention is to provide a net-like rack for receiving, positioning and supporting a plurality of open-top containers, and having means for simultaneously ejecting all of the containers partially from the rack to facilitate their removal therefrom.

Other and further objects and advantages of the improved apparatus will be apparent from the following description wherein preferred forms of embodiment of the invention are shown, reference being had to the accompanying drawings forming a part thereof, in which:

Figure 1 is a side elevational view of the rack and filling pan, showing a number of open-top containers in filling position;

Figure 2 is a top plan view of the apparatus shown in Figure 1, showing a part of the filling pan broken away;

Figure 3 is a sectional view taken along the line III—III of Figure 2;

Figure 4 is a view taken along the line IV—IV of Figure 1.

Figure 5:
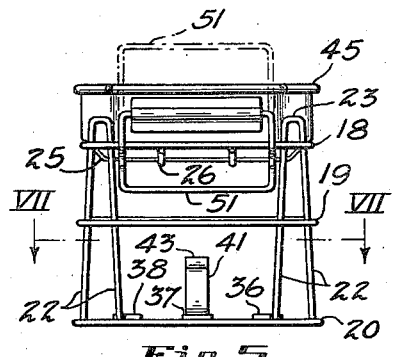
Figure 5 is an end elevational view of the apparatus shown in Figure 1, with the containers removed.

Referring to the drawings, one form of open-top confection which may be made by either embodiment of the invention is illustrated in Figure 3. This confection is an individually wrapped ice cream cone, including an edible cone 10 disposed within a cone-shaped wrapper 11, which may be made of waxed paper or other suitable water-proof or moisture-proof material. The wrapper 11 is shown entirely encircling the cone and extending above the top thereof, thereby providing not only a protective covering but also a sanitary wrapper therefor. In the preferred type of confection, ice cream or the like, extends above the top of the edible cone 10 and up to or substantially even with the top of the sanitary protective wrapper 11. If it is desired, cracked nuts, candy or particles of fruit may be sprinkled over the exposed top of the edible filling material prior to the final hardening thereof so that it will become frozen to the material in the confection when it is congealed.

The apparatus for filling and supporting the confections during the forming and harvesting operations consists of two main elements, namely, a filling pan and a rack.

Figure 6:
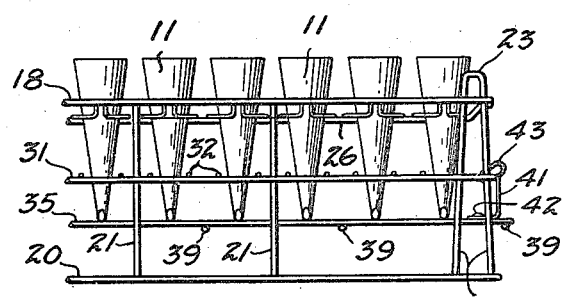
Figure 6 is a side elevational view of the rack shown in Figure 1, with the bottom raised and locked in ejecting position.
Figure 7:
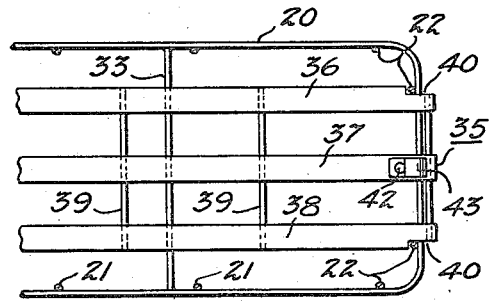
Figure 7 is a view of the rack taken along the line VII—VII of Figure 5.

Referring to the first embodiment of the invention as shown by the apparatus in Figures 1, 2, 3, 4, 5, 6 and 7, the rack 16 consists of a main frame composed of a plurality of spaced horizontally disposed wire loops or rings 18, 19 and 20 welded or soldered to vertical posts 21, forming a rectangular box-like structure. The corners of the rack 16 are reinforced by upright looped posts 22 of hair-pin shape, having the looped ends 23 projecting slightly above the top ring 18 of the rack 16. Extending transversely across the center of the ring 18 are pairs of spaced wires 24 and 25, having a series of semicircular loops 27 and 28 formed therein, the loops 27 of the wires 24 being disposed oppositely and extending outwardly from the loops 28 of the wires 25, forming a series of definitely spaced circular openings arranged in rows transversely and longitudinally of the ring. The transverse wires 24 and 25 are reinforced intermediate the loops 27 and 28 by longitudinally extending wires 26 welded to the ends of the ring 18. The center of the ring 19 is provided with a net-like mesh formed by a plurality of spaced parallel wires 31 extending longitudinally of the ring and soldered or welded to the opposite ends thereof, and a plurality of spaced parallel wires 32 extending transversely of the ring and soldered or welded to the sides thereof. The base ring 20 is reinforced by transversely extending ribs 33, as best shown in Figure 7.

Positioned on the base ring 20 is a movable bottom 35 (see Figure 7) consisting of a plurality of transversely spaced longitudinal slats 36, 37 and 38 mounted on transverse reinforcing ribs 39. The slats 36 and 38 are notched on their outer corners as at 40 to provide clearance for the legs of the corner posts 22, which act as guides when the bottom is being raised or lowered. Mounted on opposite ends of the movable bottom 35 are spring steel hooks or clamping members 41 secured by rivets 42 to the ends of the slats 37. When the bottom is manually raised the hooks 41 are adapted to engage the ends of the ring 19, as best shown in Figure 6. The hooks 41 are releasable from the ring 19 by pushing outwardly on the looped ends 43 until they are clear of the ends of the ring 19, whereupon the bottom may be lowered to its normal position on the ring 20.

It will be noted in Figure 2 that the circular openings in the ring 17 are in vertical alignment with certain of the openings in the ring 18, and that the slats 36, 37 and 38 in the movable bottom 35 extend longitudinally of the rack directly below the rows of aligned openings formed by the openings in the rings 17 and 18. Thus it will be apparent that when a container 11 is disposed in an opening in top ring 18 of the rack, it will extend through an opening in the ring 19 and rest upon a slat of the movable bottom. The openings in the ring 18 are smaller in cross-sectional area than the openings in the ring 17, thus assuring that the cone-shaped receptacles will be maintained in vertical alignment. The slats of the bottom 35 upon which the ends of the containers 21 rest will cause them to assume a common predetermined level with the top of the rack.

The apparatus for filling the containers with edible material comprises a pan 45 adapted to fit over the top of the rack 16, the sidewalls of the pan fitting snugly within the projecting ends 23 of the corner posts 22. The bottom 46 of the filling pan is provided with a plurality of outlet openings 47 which are so arranged as to be in alignment with the openings in the rack 16. A projected outlet opening 48 is provided for each opening 47 by soldering or spot-welding flanges 49 to the bottom 46 of the pan 45. The ends of the filling pan 45 are provided with handles 51, having loops 52 extending inwardly intermediate the ends of the sides 53 thereof. When the handles 51 are moved downwardly toward the rack 16, the loops 52 clampingly engage under the ends of the ring 18, as best shown in Figure 3, thereby securely locking the filling pan 45 to the rack 16.

Figure 8:
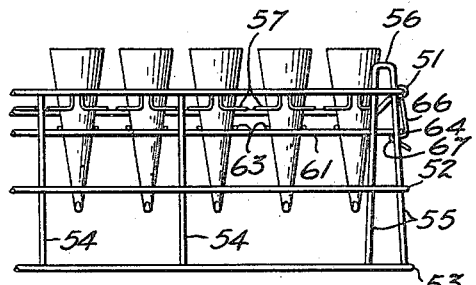
Figure 8 is a side elevational view of a modified form of apparatus, viewed similarly to Figure 6.
Figure 9:
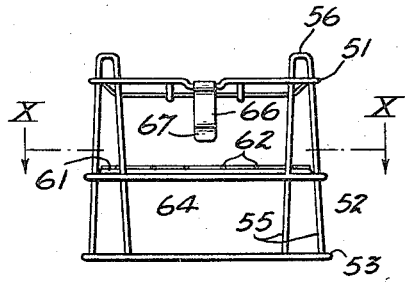
Figure 9 is an end elevational view of the rack shown in Figure 8, with the containers removed and showing the ejecting member in normal position.
Figure 10:
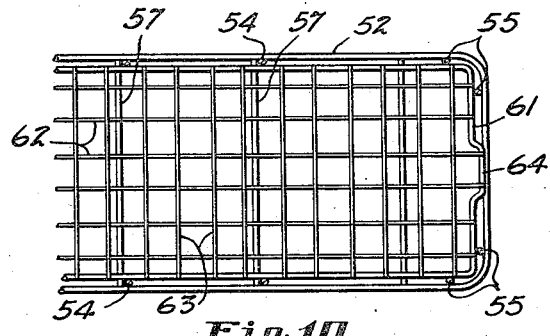
Figure 10 is a view of the rack taken along the line X—X of Figure 9.

The embodiment of the invention shown in Figures 8, 9 and 10 inclusive is a modified form of construction of the net-like rack, which consists of a main frame composed of a plurality of spaced horizontally disposed wire loops or rings 51, 52 and 53 welded or soldered to vertical uprights 54, forming a rectangular box-like structure. The corners of the rack are reinforced by upright posts 55 of hair-pin shape, having looped ends 56 projecting above the top ring 51. The center of the top ring 51 is provided with a plurality of circular openings 57 in the same manner as the ring 18 of the apparatus shown in Figures 1 and 2. The ring 52 is provided with transverse reinforcing ribs 57, as best shown in Figure 10.

Positioned on the top of the ring 52 is a movable ring 61 provided with a net-like mesh formed by a plurality of spaced parallel wires 62 extending longitudinally and a plurality of spaced parallel wires 63 extending transversely thereof. The openings thus formed in the ring snugly embrace the containers extending therethrough. The opposite ends of the ring 61 are provided with an outwardly projecting portion 64. In this embodiment the movable ring 61 is guided by the posts 55, as shown in Figure 10, and certain of the openings therein are maintained in proper alignment with the openings 57 of the top ring 51.

Mounted on the opposite ends of the ring 51 are spring steel hooks or clamping member 66, having an inwardly projecting looped end 67. When the movable ring 61 is manually raised, the looped ends 67 of the hooks 66 are adapted to engage the outward projections 64 of the ends of the ring 61, as best shown in Figure 8, thereby securely locking the ring in a raised position. The hooks 66 are releasable from the ring 61 by pulling outwardly on the looped ends 67 until they have cleared the projection 64 of the ring 61, whereupon the ring 61 may be lowered to its normal position on the ring 52. It will be apparent that any movement of the ring 61 will impart similar movement to the containers in the rack since they are snugly embraced and supported in the openings therein.

In operating the apparatus, the wrappers 11 are first inserted in the openings in the rack 16, and the filling pan 45 is placed thereon, as shown in Figures 1 and 3. A quantity of semi-frozen ice cream, sherbet, water-ice or the like, which is commonly known as "mix" in the trade, sufficient to fill the containers is then poured into the top of the filling pan. The mix, depending upon its viscosity, will tend to flow by gravity through the openings 48 and outlet projections 49 into the containers 11. If any part of the mix does not flow into the containers, a squeegee (not shown) may be employed to force the mix into the individual containers. The filling pan 45 is then removed and the mix in the projections 37 will flow into the containers 21 and fill up the space that was previously occupied by projections 49 of the filling pan.

After the filling pan 45 is removed, the rack may be placed on a table or over a bin and nuts, candy or fruit may be sprinkled thereon. An advantage of the net-like rack is that the particles of such material which do not fall on the open top surface of the confection during the sprinkling operation will pass through the rack directly on the table or back in the supply bin, whereupon they can readily be collected for further use and will not be lost or contaminated.

After the confections have been garnished with candy, nuts or fruit, the racks, with the confections therein, are subjected to a period of refrigeration until the contents thereof are solidified by congelation. A further advantage of the net-like rack is that the containers are supported during refrigeration by the rack with a minimum amount of surface contact, thereby inhibiting the formation of a congelation bond between the contacting surfaces, which will tend to prevent ready removal of the confections from the rack.

After the confections are finished they may be readily removed from the rack by raising the movable bottom, or the movable ring, to ejecting position, which in turn will partially eject the confections above the top of the rack until they may readily be grasped by the hand and entirely removed from the rack.

Although I have only described in detail several forms which the invention may assume, it will be apparent to those skilled in the art that the invention is not so limited but that various modifications may be made therein without departing from the spirit thereof or from the scope of the appended claims.

What I claim is:

1. In a rack for holding a plurality of open-top food containers, a top member having definitely spaced openings therein for receiving a plurality of containers in spaced relation, and a co-operating supporting member for said containers, said co-operating member being movable and having means extending outwardly therefrom for moving it with respect to the rack for effecting a partial ejectment of the containers therefrom.

2. In a rack for holding a plurality of open-top food containers, a spaced wire top member having definitely spaced openings therein for receiving a plurality of containers in spaced relation, a co-operating supporting member for said containers which is movable with respect to the rack for partially ejecting the containers therefrom, and means extending inwardly of the rack for locking and maintaining the cooperating member in its raised position.

3. A net-like rack for holding a plurality of open-top food containers, including a spaced wire top having definitely spaced openings therein for positioning the containers in spaced relation, a co-operating spaced wire section having a plurality of openings therein of smaller cross-sectional area than the openings in the top for maintaining the containers in vertical alignment, and a bottom having flat strips extending below the rows of aligned vertical openings for supporting the containers at a predetermined level in the rack, said bottom having means for moving it with respect to the rack and maintaining it in a raised position to effect a partial ejectment of the containers therefrom.

4. A net-like rack for holding a plurality of open-top food containers, including a spaced wire top having definitely spaced openings therein for positioning the containers in spaced relation, a cooperating spaced wire section having spaced openings therein smaller in cross-sectional area than the openings in the top for maintaining the containers in vertical alignment, and a bottom having a plurality of spaced strips for holding the containers at a predetermined level above the top of the rack, said bottom having integral means extending outwardly therefrom for moving it with respect to the rack to effect a partial ejectment of the containers.

5. A net-like rack for holding a plurality of open-top food containers in spaced relation, including a spaced wire top having definitely spaced openings therein for positioning the containers in spaced relation, a co-operating spaced wire intermdiate section having spaced openings therein smaller in cross-sectional area than the openings in the top for maintaining the containers in vertical alignment with the top, and a bottom for holding the containers at a predetermined level above the top of the rack, said bottom being movable with respect to the rack for partially ejecting the containers therefrom and having means extending outwardly from opposite sides thereof for engaging the rack for locking it in its raised position.

6. A net-like rack for holding a plurality of open-top food containers in spaced relation, including a spaced wire portion having definitely spaced openings for positioning the containers in spaced relation, a co-operating spaced wire intermediate section having spaced openings therein smaller in cross-sectional area than the openings in the top for maintaining the containers in vertical alignment with the top, and a bottom composed of a plurality of spaced strips for holding the containers at a predetermined level above the top of the rack, said bottom being movable with respect to the rack for partially ejecting the containers therefrom and having integral means extending outwardly and away from each end thereof for engaging the rack for maintaining it in its raised position.

7. A net-like rack for holding a plurality of open-top food containers in spaced relation, including a spaced wire top having definitely spaced openings therein for positioning the containers in horizontal spaced relation, and a co-operating spaced wire intermediate section having openings therein smaller in cross-sectional area than the openings in the top for maintaining said containers in vertical position, said intermediate section being movable with respect to the rack for partially ejecting the containers therefrom.

8. A net-like rack for holding a plurality of open-top food containers in horizontal spaced relation, including a spaced wire top having definitely spaced openings therein, a co-operating spaced wire intermediate section having openings therein smaller in cross-sectional area than the openings in the top for maintaining said containers in alignment, said intermediate section being movable with respect to the rack for effecting a partial ejectment of the containers therefrom, and means for locking said intermediate section in ejecting position.

9. In combination, a net-like rack for holding a plurality of open-top food containers including spaced wires co-operating for forming definitely spaced openings therein for positioning the upper parts of the containers in spaced relation, spaced wires co-operating for forming openings smaller in cross-sectional area than the openings for positioning the containers for maintaining the containers in vertical alignment with the top and a bottom composed of a plurality of spaced strips for holding the containers at a predetermined level above the top of the rack, and a filling pan disposed above the rack having outlet projections extending downwardly within the containers for diverting food from the pan to the containers, said pan having means for securing it to the rack.

10. In combination, a net-like rack for holding a plurality of open-top food containers including a spaced wire top having definitely spaced openings therein for positioning the containers in spaced relation, a co-operating spaced wire section having openings therein smaller in cross-sectional area than the openings in the top for maintaining the containers in vertical alignment and a bottom composed of a plurality of spaced strips for holding the containers at a predetermined level above the top, said bottom being movable for partially ejecting the containers from the rack, and a filling pan having outlet projections extending downwardly within the containers for diverting food from the pan into the containers, said pan having means for rigidly securing it to the rack, and said rack including a wire frame having upwardly extending portions for guiding said pan.

NORMAN M. THOMAS.